No. 778,173. Patented December 20, 1904.

UNITED STATES PATENT OFFICE.

CHARLES F. CROSS, OF LONDON, ENGLAND, AND JOHN TRAQUAIR, OF PAISLEY, SCOTLAND, ASSIGNORS TO THE FIRM OF WILLIAM WOTHERSPOON, OF PAISLEY, SCOTLAND.

SOLUBLE PRODUCT FROM STARCH AND PROCESS OF MAKING SAME.

SPECIFICATION forming part of Letters Patent No. 778,173, dated December 20, 1904.

Application filed November 29, 1902. Serial No. 133,259. (Specimens.)

*To all whom it may concern:*

Be it known that we, CHARLES FREDERICK CROSS, a citizen of England, residing at 4 New Court, Lincolns Inn, London, England, and JOHN TRAQUAIR, a subject of the King of Great Britain, residing at Glenfield Starch Works, Paisley, in the county of Renfrew, Scotland, have invented a certain new and useful Soluble Product from Starch and Process of Making the Same, (for which we have applied for a patent in Great Britain, dated April 29, 1902, No. 9,868,) of which the following is a specification.

Several processes are used for converting starch into a product which is permanently soluble, the starch being for this purpose treated with acids, alkalies, or salts. Most of these processes are difficult of control, and their final products generally contain the reagents used either in their original form or as derivative compounds with more or less complex soluble products derived from the starch.

The fact has been recorded (*A Dictionary of Chemistry*, by Henry Watts, vol. V, p. 410, line 2) that glacial acetic acid heated in a sealed tube with starch converts the latter into soluble starch. This fact appears to have been overlooked and does not seem to have been again recorded in literature. In the place cited no directions for the successful application of the fact are given, nor is there any suggestion that the soluble starch produced is a different product from that obtained by other methods.

Our invention relates to the manufacture of a soluble product from starch with the aid of certain monocarboxylic acids.

We are aware that certain organic acids have been suggested as substitutes for mineral acids in the well-known process for hydrolyzing starch by heating it with water and a small percentage of acid or alkali. Our invention, however, is in no way concerned with the aqueous hydrolysis of starch. Indeed, it is best practiced in absence of water, although this may be present without serious injury to the process, provided there is sufficient acid present for its action to predominate over the hydrolyzing action of the water. We have found that with such acids a product can be obtained which is different from the soluble products from starch hitherto made, in chemical properties and in that it dissolves completely to a clear solution in boiling water, which solution does not gelatinize or separate therefrom even after some time, resists the action of ferments, and when dried yields an elastic continuous film.

Our process is illustrated by the following examples:

1. Some form of starch, preferably farina or potato starch in fine powder, is dried at 80° to 100° centigrade and fed into a vessel, such as a rotary steam-jacketed converter, and glacial acetic acid is added thereto to the extent of about one-third or one-half the weight of the starch. A smaller proportion of acid—for instance, some twenty to thirty per cent. of the weight of the starch—may be used if the acid is sprayed by a suitable atomizer upon the starch in a cylindrical mixer and the mixture then charged into the converter. The vessel is now closed and revolved slowly until the acid and starch are well mixed, when steam is turned into the jacket. The heating is continued for one to two hours, during which time the vessel is kept slowly revolving. During this operation or after it is completed the vessel may be connected with a condenser to allow the acetic acid to be distilled off for further use. The product is now allowed to cool and washed with cold water. It does not differ in appearance from ordinary starch and may be dried and finished by any well-known method.

Instead of employing the acetic acid as directed above the acid may be evolved as vapor by treatment of an acetate with a non-volatile acid in a separate vessel and conducted as vapor into a mixer containing the dried starch until the latter has absorbed some twenty per cent. of its weight of the acid. The mixture is then fed into the converter heated, as described above.

2. The dried starch is mixed in a cylindrical mixer by aid of a spraying device with some ten per cent. of its weight of formic acid containing sixty to ninety per cent. of the acid. This mixture is fed into the converting vessel and is treated, as in the preceding example, for from one to four hours, according to the degree of conversion required—that is to say, the degree of solubility of the starch in hot water. The cooled product is washed with cold water and dried, or the acid left in the starch may be neutralized by addition of a suitable alkali, such as borax or an alkali carbonate.

In using formic acid it is sometimes found that the starch swells considerably. In this case a neutral dehydrating agent may be added. Thus the formic acid prescribed above may be mixed with an equal volume of commercial alcohol.

In the foregoing processes anhydrous or nearly anhydrous materials are used. If the time of conversion is not an important object, aqueous organic acids of the kind referred to may be used. In this case the procedure is practically the same. If, for example, an excess of an aqueous solution of lactic acid containing twenty to thirty per cent. of the real acid is mixed with the starch, the excess of liquid expelled in a centrifugal machine and the mixture dried in a stove, the conversion may be effected in some forty to fifty hours. A similar result is obtained if the quantity of aqueous acid is limited to that necessary to produce a damp powder, and the mixture is made with aid of a sprayer. A dilute acetic acid containing twenty to forty per cent. of real acid or dilute formic acid containing ten to twenty per cent. of acid may be substituted for the aqueous lactic acid.

When dilute acids are used, the acid may be diluted, not with water, which on heating has a swelling effect on the starch-granules, but with alcohols or other volatile liquids, which have no swelling action on the starch-granules at the temperature of treatment. In this case a closed vessel must be used and the diluent recovered by distillation. When the acid is diluted with water, certain concentrated saline solutions, such as a solution of sodium chlorid, may be added to prevent the swelling of the granules. When alcohol or the saline solution is used, the treatment can be carried out at higher temperatures, and consequently in shorter time.

Having thus described the nature of this invention and the best means we know of carrying the same into practical effect, we claim—

1. A process of manufacturing a soluble product from starch which consists in heating the starch moistened with at least ten per cent. of its weight of an anhydrous monocarboxylic acid.

2. A process of manufacturing a soluble product from starch which consists in heating the starch moistened with sufficient of anhydrous monocarboxylic acid containing at least ten per cent. of the acid to make a mixture in which the real acid is at least ten per cent. of the weight of the starch.

3. A process of manufacturing a soluble product from starch, which consists in heating the starch in the presence of monocarboxylic acid diluted with a volatile organic liquid.

4. A process of manufacturing a soluble product from starch which consists in heating the starch in the presence of a monocarboxylic acid diluted with alcohol.

5. A process of manufacturing a soluble product from starch which consists in heating the starch moistened with at least ten per cent. of its weight of an anhydrous monocarboxylic acid and then suitably washing and drying the product.

6. A process of manufacturing a soluble product from starch which consists in heating the starch moistened with sufficient of anhydrous monocarboxylic acid containing at least ten per cent. of the acid to make a mixture in which the real acid is at least ten per cent. of the weight of the starch, and then suitably washing and drying the product.

7. A process of manufacturing a soluble product from starch, which consists in heating the starch in the presence of monocarboxylic acid diluted with a volatile organic liquid, and then suitably washing and drying the product.

8. A process of manufacturing a soluble product from starch, which consists in heating the starch in the presence of a monocarboxylic acid diluted with alcohol, and then suitably washing and drying the product.

9. A process of manufacturing a soluble product from starch which consists in heating the starch moistened with at least ten per cent. of its weight of an anhydrous acetic acid.

10. A process of manufacturing a soluble product from starch, which consists in heating starch in the presence of a monocarboxylic acid with a dehydrating agent.

11. A process of manufacturing a soluble product from starch, which consists in first drying the starch at 80° to 100° centigrade then moistening it with at least ten per cent. of its weight of an anhydrous monocarboxylic acid, and finally heating the starch so moistened.

12. A process of manufacturing a soluble product from starch which consists in first drying the starch at 80° to 100° centigrade, then moistening it with at least ten per cent. of its weight of an anhydrous monocarboxylic acid, heating the starch so moistened, and then suitably washing and drying the product.

13. A process of manufacturing a soluble product from starch, which consists in first drying the starch at 80° to 100° centigrade, then moistening it with at least ten per cent. of its weight of an anhydrous acetic acid, and then heating the starch so moistened.

14. A process of manufacturing a soluble product from starch, which consists in first drying the starch at 80° to 100° centigrade, then moistening it with at least ten per cent. of its weight of an anhydrous acetic acid, then heating the starch so moistened, and then suitably washing and drying the product.

15. As a new article of manufacture, a soluble product from starch, said product completely soluble in boiling water to a clear solution, which solution does not gelatinize or separate for a long period, resists the action of ferments and when dried yields an elastic continuous film.

In testimony whereof we have hereunto set our hands in presence of two subscribing witnesses.

CHARLES F. CROSS.
JOHN TRAQUAIR.

Witnesses:
WALTER J. SKERTEN,
GERALD L. SMITH.